(12) United States Patent
Liu

(10) Patent No.: US 8,094,446 B2
(45) Date of Patent: Jan. 10, 2012

(54) BRACKET FOR MOUNTING HARD DISK DRIVE

(75) Inventor: Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 306 days.

(21) Appl. No.: 12/606,127

(22) Filed: Oct. 26, 2009

(65) Prior Publication Data

US 2011/0075347 A1 Mar. 31, 2011

(30) Foreign Application Priority Data

Sep. 25, 2009 (CN) .......................... 2009 1 0307721

(51) Int. Cl.
*G06F 1/16* (2006.01)
(52) U.S. Cl. .................................................. 361/679.33
(58) Field of Classification Search .............. 361/679.33
See application file for complete search history.

(56) References Cited

U.S. PATENT DOCUMENTS

| | | | | |
|---|---|---|---|---|
| 5,943,208 A * | 8/1999 | Kato et al. | ............... | 361/679.31 |
| 6,122,175 A * | 9/2000 | Shieh | ........................... | 361/737 |
| 6,249,432 B1 * | 6/2001 | Gamble et al. | .......... | 361/679.35 |
| 6,377,450 B1 * | 4/2002 | Gan | ........................ | 361/679.34 |
| 6,918,174 B2 * | 7/2005 | Kim et al. | .................. | 29/603.04 |
| 7,542,280 B2 * | 6/2009 | Hong et al. | ............. | 361/679.33 |
| 7,684,181 B2 * | 3/2010 | Peng et al. | ............... | 361/679.33 |
| 7,813,117 B2 * | 10/2010 | Olesiewicz et al. | ...... | 361/679.34 |
| 2006/0156930 A1 * | 7/2006 | Xing | ............................... | 99/485 |
| 2006/0232925 A1 * | 10/2006 | Han et al. | ...................... | 361/685 |
| 2008/0094794 A1 * | 4/2008 | Hass | ............................. | 361/685 |
| 2008/0259554 A1 * | 10/2008 | Qin et al. | ...................... | 361/685 |
| 2009/0073649 A1 * | 3/2009 | Ikeda et al. | .............. | 361/679.35 |
| 2009/0095873 A1 * | 4/2009 | Peng et al. | ..................... | 248/560 |
| 2009/0129009 A1 * | 5/2009 | Zhang et al. | ............. | 361/679.34 |
| 2009/0146030 A1 * | 6/2009 | Chen et al. | ................. | 248/213.2 |
| 2009/0164685 A1 * | 6/2009 | Chen et al. | .................... | 710/301 |
| 2009/0224115 A1 * | 9/2009 | Zhang et al. | ................. | 248/201 |
| 2009/0230276 A1 * | 9/2009 | Peng et al. | .................... | 248/544 |
| 2011/0005068 A1 * | 1/2011 | Zhang et al. | ................... | 29/729 |

* cited by examiner

*Primary Examiner* — Lisa Lea Edmonds
(74) *Attorney, Agent, or Firm* — Altis Law Group, Inc.

(57) ABSTRACT

A HDD assembly comprises a HDD defining a plurality of mounting holes therein and a bracket for fixing the HDD. The bracket comprises a fixing plate and a holding frame connected with the fixing plate. The holding frame defines a receiving space for receiving the HDD therein. The holding frame comprises a resilient clip. The resilient clip forms a plurality of poles engaging in the mounting holes of the HDD, to firmly fix the HDD in the receiving space of the bracket.

11 Claims, 4 Drawing Sheets

BRACKET FOR MOUNTING HARD DISK DRIVE

BACKGROUND

1. Technical Field

The present disclosure relates to a bracket for mounting a hard disk drive thereon.

2. Description of Related Art

With development in computer technology, computers have become an indispensable part of our daily life. In a computer, a hard disk drive (HDD) is needed for storing information. Generally, the HDD is mounted on a frame and the frame is then mounted in the computer. However, the frame generally can only mount a limited number of HDDs. For example, only one or two HDDs can be mounted on the frame. If more HDDs are desired in the computer, another frame is needed to mount the additional HDDs thereon. However, the computer generally has a limited space, thus may not have room for accommodating another frame therein.

What is needed, therefore, is a device for expanding the number of HDDs for the computer to thereby overcome the above described shortcomings.

DETAILED DESCRIPTION

Figure 1:
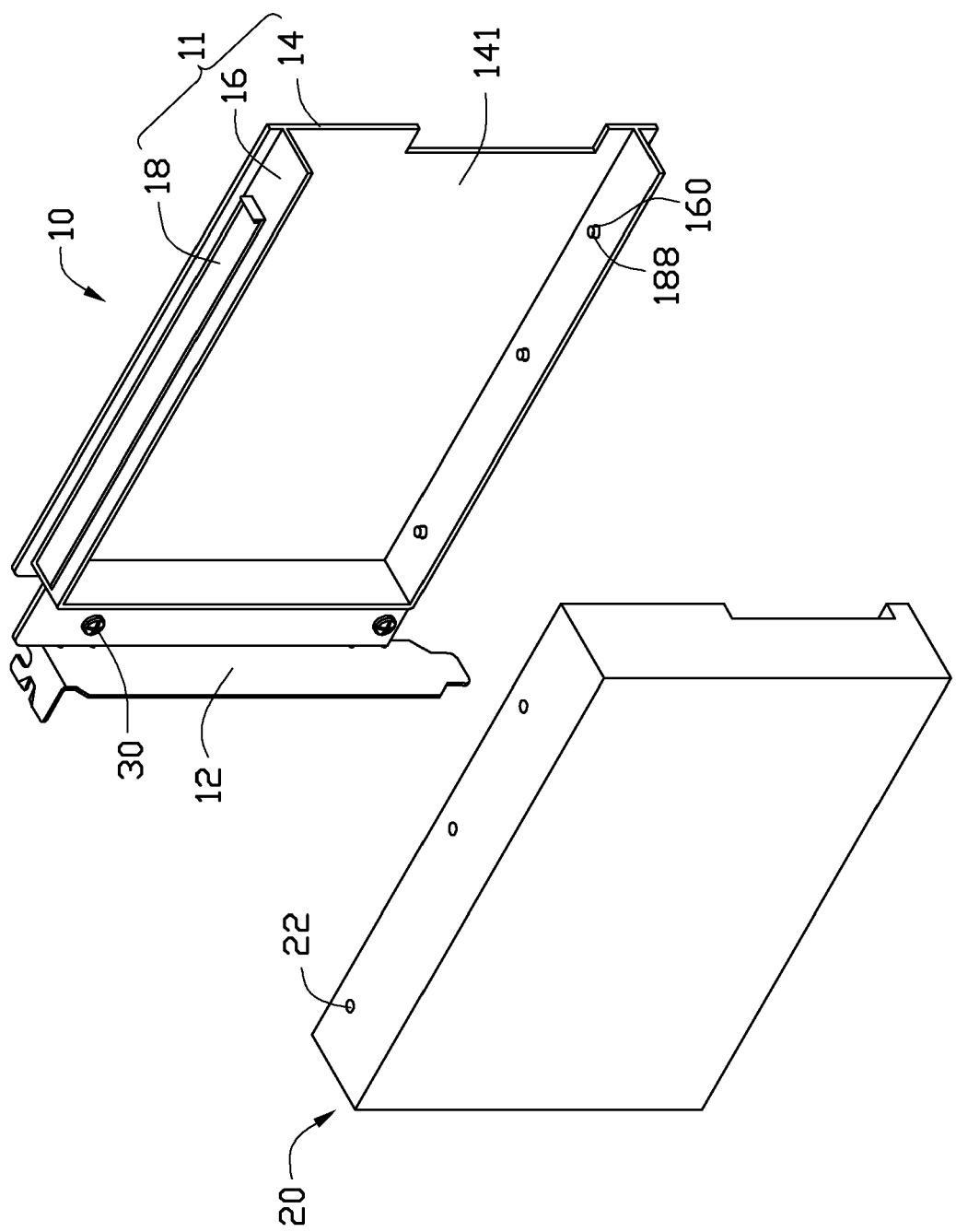
FIG. 1 is an isometric view of a bracket for mounting a HDD according to an exemplary embodiment.
Figure 2:
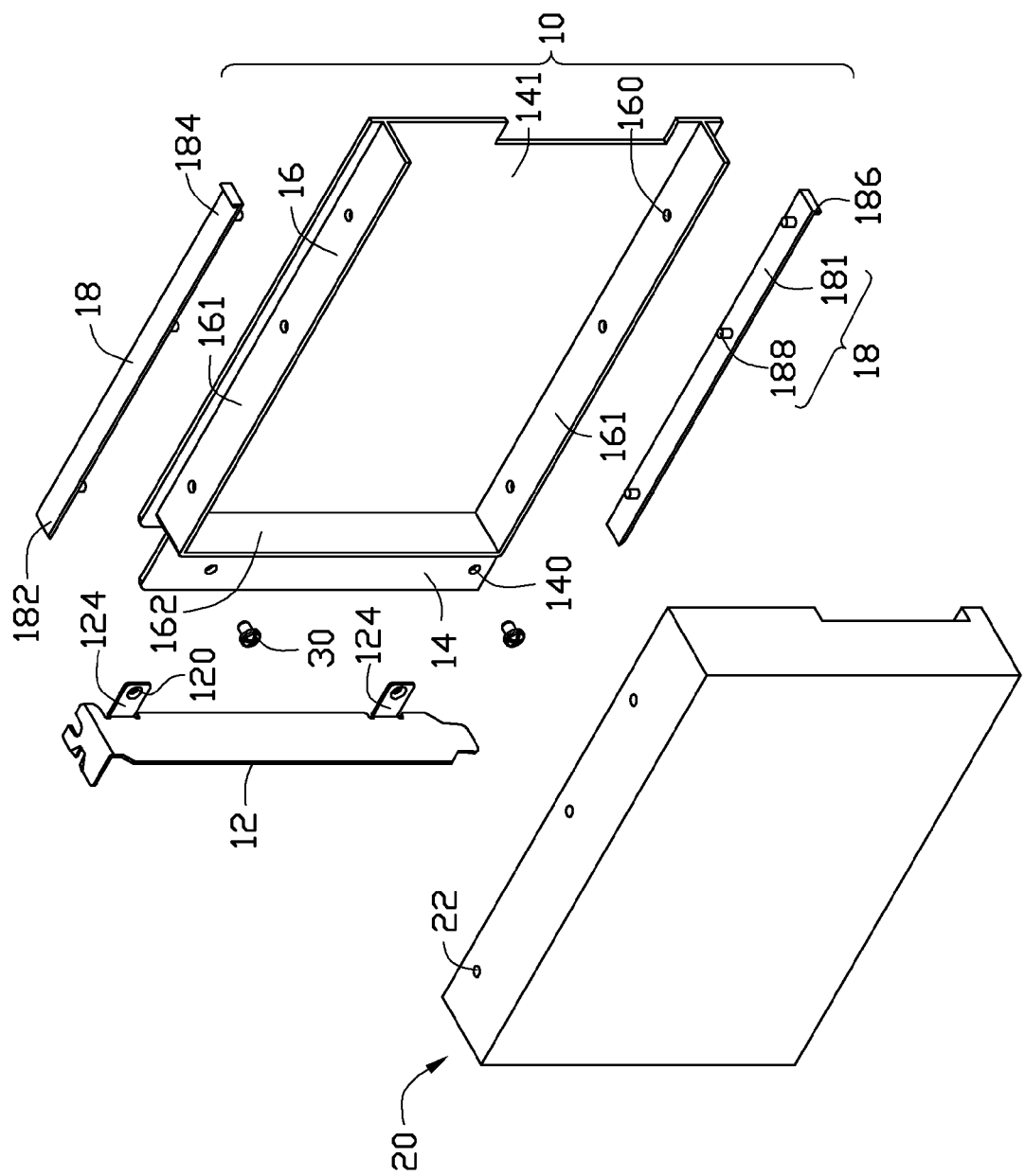
FIG. 2 is similar to FIG. 1, but the bracket is shown in an exploded manner.

Referring to FIGS. 1 and 2, a bracket 10 for mounting a HDD 20 according to an exemplary embodiment is shown. The bracket 10 is to be installed in an enclosure (not shown) of a computer. The HDD 20 defines a plurality of mounting holes 22 at each of top and bottom sides thereof.

The bracket 10 includes a fixing plate 12 for connecting with the enclosure of the computer and a holding frame 11 connected with the fixing plate 12 for mounting the HDD 20. A pair of securing ears 124 extend perpendicularly outwardly from a lateral side edge of the fixing plate 12 towards the holding frame 11. The securing ears 124 each define a securing hole 120 therein.

Figure 4:
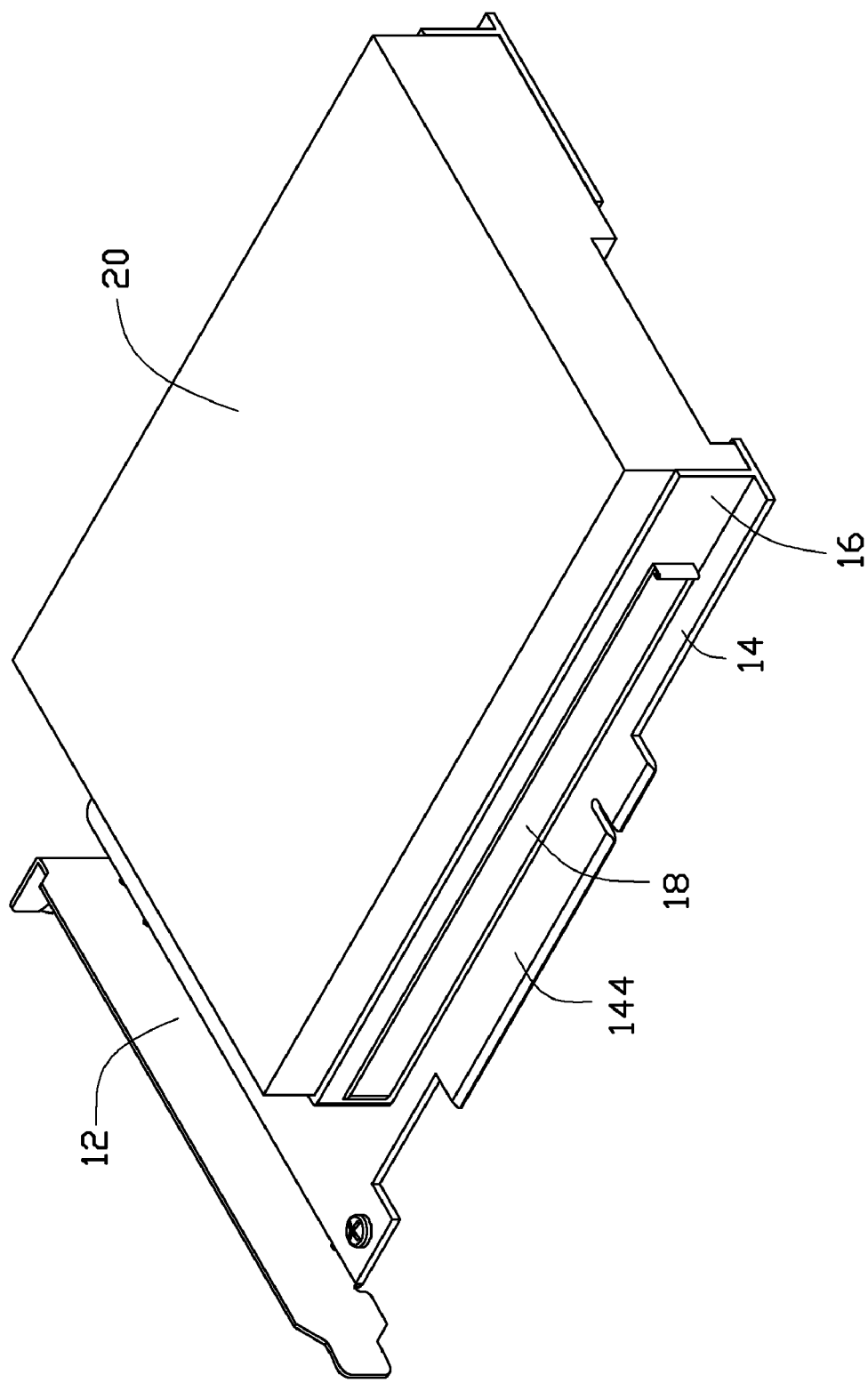
FIG. 4 is an assembled, isometric view of the bracket and the HDD of FIG. 1.

The holding frame 11 includes a rectangular mounting plate 14, a U-shaped enclosing wall 16 extending perpendicularly outwardly from a front surface of the mounting plate 14, and a pair of resilient clips 18 connected with the enclosing wall 16. The mounting plate 14 defines two through holes 140 at a left side thereof. The through holes 140 are aligned with the securing holes 120 of the securing ears 124 of the fixing plate 12, respectively, such that screws 30 can extend through the through holes 140 and the securing holes 120 to connect the fixing plate 12 and the holding frame 11 together. Referring also to FIG. 4, a pin set 144 extends downwardly from a bottom of the mounting plate 14 for being received in an appropriate slot available in the enclosure of the computer.

The enclosing wall 16 includes a pair of parallel first flanges 161 and a second flange 162 which is shorter than each of the first flanges 161. The first flanges 161 are formed at the top and bottom sides of the mounting plate 14, respectively. The second flange 162 is formed at one side of the mounting plate 14. The second flange 162 is located adjacent to and parallel with the fixing plate 12. The second flange 162 is perpendicular to and connected between the two first flanges 161, such that the first and second flanges 161, 162 cooperatively define a receiving space 141 for receiving the HDD 20 therein. The receiving space 141 has an open end at one side thereof. The two first flanges 161 each define a plurality of through holes 160 therein.

The two resilient clips 18 are respectively attached to the two first flanges 161. The resilient clips 18 are made of materials with good elasticity. Each of the resilient clips 18 includes a sheet 181 and a plurality of poles 188 extending from the sheet towards the receiving space 141. The sheet 181 is attached to an outer surface of a corresponding first flange 161 of the enclosing wall 16. The sheet 181 includes a fixed end 182 fixed on the first flange 161 of the enclosing wall 16, and an opposite free end 184. A handle tab 186 for facilitating manual operation extends perpendicularly from a distal tip of the free end 184 of the sheet 181 and points away from the first flange 161 of the enclosing wall 16. The poles 188 extend through the through holes 160 of the first flanges 161 and protrude into the receiving space 141.

Figure 3:
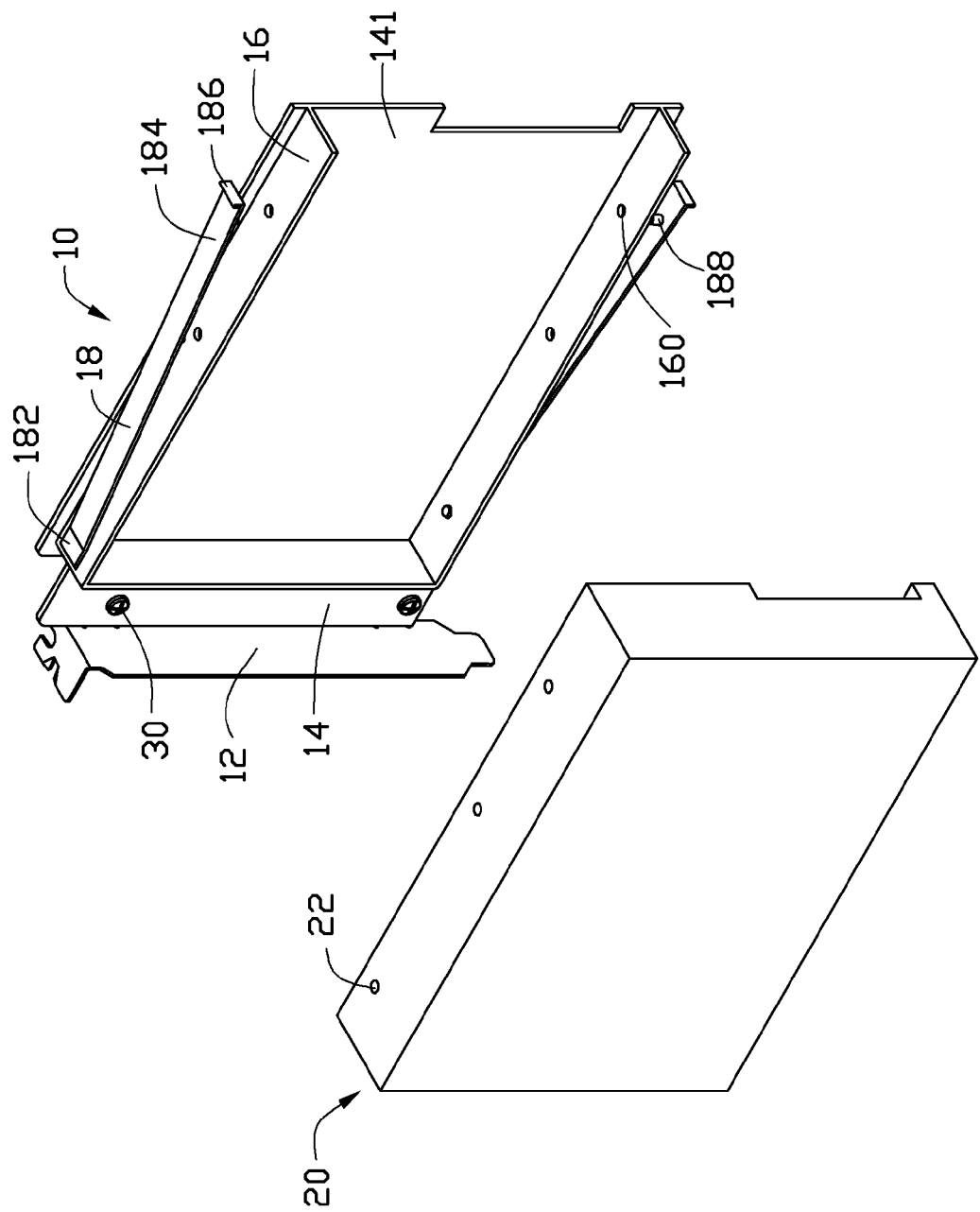
FIG. 3 is similar to FIG. 1, wherein the HDD is to be mounted onto the bracket.

Referring to FIGS. 3 and 4, in assembly, the handle tabs 186 of the resilient clips 18 are pulled to cause the free ends 184 of the sheets 181 to move away from the first flanges 161 of the enclosing wall 16. As the fixed ends 182 of the resilient clips 18 are fixedly connected with the first flanges 161, the resilient clips 18 may deform. In this state, the poles 188 of the resilient clips 18 move away from the through holes 160 of the first flanges 161 of the enclosing wall 16, and the resilient clips 18 deform. Then, the HDD 20 is placed into the receiving space 141 with the mounting holes 22 of the HDD 20 respectively aligned with the through holes 160 of the first flanges 161 of the enclosing wall 16. By releasing the free ends 184 of the resilient clips 18, the resilient clips 18 resume to their original state, and the poles 188 extend through the through holes 160 of the first flanges 161 and engage in the mounting holes 22 of the HDD 20, respectively. Thus, the HDD 20 is firmly fixed in the receiving space 141 of the bracket 10 by the resilient clips 18.

Generally, a plurality of expansion slots for mounting expansion cards, such as peripheral component interconnect (PCI) cards and accelerated graphics ports (AGP) cards, are set on a motherboard of the computer. Some of the expansion slots are often not used. In other words, no expansion cards are mounted on these unused expansion slots. Since the bracket 10 has a profile like an expansion card and a pin set 144 is provided on the bracket 10, the bracket 10 can advantageously utilize an unused expansion slot and make use of the space above the unused expansion slot in the computer for fixing the HDD 20, whereby the storage capacity of the computer is greatly expanded. In addition, assembly and disassembly of the HDD 20 is convenient due to the presence of the resilient clips 18.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A HDD assembly, comprising:
 a HDD defining a plurality of mounting holes at two opposite sides thereof; and
 a bracket comprising a fixing plate and a holding frame connected to the fixing plate, the holding frame comprising a mounting plate and an enclosing wall extending outwardly from the mounting plate, the enclosing wall and the mounting plate cooperatively defining a receiving space of the holding frame for receiving the HDD therein, the holding frame comprising at least one resilient clip forming a plurality of poles, the poles engaging in the mounting holes of the HDD to fix the HDD in the receiving space of holding frame.

2. The HDD assembly of claim 1, wherein the enclosing wall is U-shaped, including a pair of parallel first flanges and a second flange connected between the pair of parallel first flanges.

3. The HDD assembly of claim 2, wherein the second flange is located adjacent to the fixing plate.

4. The HDD assembly of claim 2, wherein the at least one resilient clip includes two resilient clips attached to the first flanges of the enclosing wall respectively, each of the first flanges defining a plurality of through holes therein, each of the resilient clips comprising a fixed end fixed on a corresponding first flange of the enclosing wall and an opposite free end, the poles of the resilient clips extending through the through holes of the first flanges of the enclosing wall into the receiving space.

5. The HDD assembly of claim 4, wherein a handle tab is formed at the free end of each of the resilient clips.

6. The HDD assembly of claim 1, wherein a pin set is formed at a bottom of the mounting plate of the holding frame.

7. A bracket for mounting a HDD, the bracket comprising:
a fixing plate;
a holding frame connected with the fixing plate, the holding frame comprising a mounting plate and an enclosing wall extending from the mounting plate, the enclosing wall and the mounting plate cooperatively defining a receiving space of the holding frame for receiving the HDD therein; and
at least one resilient clip attached to the holding frame, the at least one resilient clip comprising a plurality of poles adapted for extending into mounting holes defined in the HDD to fix the HDD in the receiving space.

8. The bracket of claim 7, wherein the enclosing wall is U-shaped and comprises a pair of parallel first flanges and a second flange connected between the pair of parallel first flanges.

9. The bracket of claim 8, wherein the at least one resilient clip includes two resilient clips attached to the first flanges, respectively, each of the first flanges defining a plurality of through holes therein, the poles extending through the through holes and protruding into the receiving space.

10. The bracket of claim 9, wherein each of the resilient clips comprises a fixed end and an opposite free end, the fixed end being fixed on a corresponding first flange of the enclosing wall.

11. The bracket of claim 10, wherein a handle tab is formed at the free end of each of the resilient clips.

\* \* \* \* \*